United States Patent
Jung et al.

(10) Patent No.: US 10,100,073 B2
(45) Date of Patent: Oct. 16, 2018

(54) METHOD FOR PREPARING LOW-MOLECULAR LIGNIN DERIVATIVE

(71) Applicant: CJ CHEILJEDANG CORP., Seoul (KR)

(72) Inventors: Min Ho Jung, Seoul (KR); Sun Joo Moon, Seoul (KR); Jeung Yil Park, Seoul (KR); Sang Mok Lee, Seoul (KR); Da Eun Kim, Seoul (KR); Young Ran Kim, Yongin-si (KR); Jung Min Kim, Bucheon-si (KR); Jin Hwa Chang, Gunpo-si (KR)

(73) Assignee: CJ CHEILJEDANG CORP., Seoul (KR)

( * ) Notice: Subject to any disclaimer, the term of this patent is extended or adjusted under 35 U.S.C. 154(b) by 0 days.

(21) Appl. No.: 14/892,947

(22) PCT Filed: May 22, 2014

(86) PCT No.: PCT/KR2014/004592
§ 371 (c)(1),
(2) Date: Nov. 20, 2015

(87) PCT Pub. No.: WO2014/189311
PCT Pub. Date: Nov. 27, 2014

(65) Prior Publication Data
US 2016/0102114 A1 Apr. 14, 2016

(30) Foreign Application Priority Data
May 23, 2013 (KR) ........................ 10-2013-0058539

(51) Int. Cl.
*C07G 1/00* (2011.01)
(52) U.S. Cl.
CPC ...................................... *C07G 1/00* (2013.01)
(58) Field of Classification Search
CPC .............. C07G 1/00; C08H 6/00; C08H 8/00
See application file for complete search history.

(56) References Cited

U.S. PATENT DOCUMENTS

| | | | |
|---|---|---|---|
| 3,253,044 A * | 5/1966 | Goheen | C07C 37/54 530/503 |
| 4,511,433 A | 4/1985 | Tournier et al. | |
| 4,731,491 A * | 3/1988 | Urban | C07C 37/54 530/502 |
| 6,207,808 B1 * | 3/2001 | Naae | C08H 6/00 166/266 |
| 2007/0083039 A1 | 4/2007 | Hayashi et al. | |
| 2008/0220974 A1 | 9/2008 | Lopretti | |
| 2009/0176286 A1 | 7/2009 | O'Connor et al. | |

FOREIGN PATENT DOCUMENTS

| | | |
|---|---|---|
| CN | 101143881 A | 3/2008 |
| CN | 101260283 A | 9/2008 |
| EP | 2336193 A1 | 6/2011 |
| EP | 2559768 | 2/2013 |
| JP | 200515687 A | 1/2005 |
| JP | 2012006857 | 1/2012 |
| KR | 1020060114323 | 11/2006 |
| KR | 1020110121423 | 11/2011 |
| WO | 2012151509 | 11/2012 |

OTHER PUBLICATIONS

Chum, H. L., et al. "Lignin hydrotreatment to low-molecular-weight compounds." Advances in solar energy. Springer US, 1988. 91-200.*
Saisu, Motofumi, et al. "Conversion of lignin with supercritical water-phenol mixtures." Energy & Fuels 17.4 (2003): 922-928.*
Okuda, Kazuhide, et al. "Efficient conversion of lignin into single chemical species by solvothermal reaction in water-p-cresol solvent." Journal of Physics: Condensed Matter 16.14 (2004): S1325.*
Ligero, Pablo, et al. "Delignification of Eucalyptus globulus saplings in two organosolv systems (formic and acetic acid): Preliminary analysis of dissolved lignins." Industrial Crops and Products 27.1 (2008): 110-117.*
Tetrahydrofuran Physical Properties, http://www.sigmaaldrich.com/chemistry/solvents/tetrahydrofuran-center.html, downloaded on Aug. 2, 2016 at 3:36:49 PM.*
HPLC Grade Tetrahydrofuran, http://www.sigmaaldrich.com/catalog/product/aldrich/270385?lang=en&region=US, downloaded on Aug. 2, 2016 at 4:12:23 PM.*
International Search Report—PCT/KR2014/004592 dated Aug. 26, 2014.
Written Opinion—PCT/KR2014/004592 dated Aug. 26, 2014.
Chinese Office Action for Application No. 201480039718.X dated Sep. 18, 2016.
Extended European Search Report for Application No. 14801290.9 dated Nov. 16, 2016.
Chinese Office Action for Application No. 201480039718 dated Feb. 23, 2018.

* cited by examiner

Primary Examiner — Nicholas E Hill
(74) Attorney, Agent, or Firm — Cantor Colburn LLP

(57) ABSTRACT

A method of preparing a low-molecular lignin derivative comprises the step of: preparing lignin by hydrolyzing lignocellulosic biomass with an acid; preparing a first mixture by mixing 100 parts by weight of the lignin and 500 parts or more by weight of a phenolic compound; preparing a second mixture by mixing the first mixture with a solvent including the hydrophobic polar solvent; and recovering a low-molecular lignin derivative from the second mixture.

17 Claims, No Drawings

METHOD FOR PREPARING LOW-MOLECULAR LIGNIN DERIVATIVE

TECHNICAL FIELD

The present application relates to a preparation method of a low-molecular lignin derivative.

BACKGROUND ART

Depletion of fossil fuel resources such as petroleum or coal as industrial raw materials has been expected, and thus much attention has been focused on biomass permanently used. Of the biomass, lignocellulosic biomass is highly useful because it does not compete with other food resources.

Lignocellulosic biomass is composed of hydrophilic carbohydrate such as cellulose and hydrophobic lignin. The hydrophilic carbohydrate such as cellulose is used as a raw material for paper, but it can be used as a sugar supply source through a hydrolytic process. The hydrophobic lignin is a natural phenolic polymer which accounts for 15~20% of lignocellulosic biomass, and its quantitative, qualitative molecular control is difficult due to a complicated structure. Further, the hydrophobic lignin forms a complicated complex with the hydrophilic carbohydrate such as cellulose, and therefore, there is a restriction in use.

To increase usability of the hydrophobic lignin, the hydrophobic lignin can be converted into an organic solvent-soluble form by avoiding lignin recondensation and increasing the content of a phenolic —OH group by treatment of lignocellulosic biomass with a phenol-based compound and a strong acid, but a molecular weight of the resulting lignin is not as low as those of petrochemical raw materials.

With regard to use of the degraded lignin derivative as a starting material of other chemical reactions such as preparation of commercial polymer resins, the lignin derivative becomes more useful as it has a low molecular weight.

Accordingly, there is a need for a method capable of easily degrading lignin into a low-molecular weight lignin with a high yield and a conversion method of maintaining a low equivalent weight of phenolic OH of the derived lignin (an equivalent weight of phenolic OH=a molecular weight of lignin/the number of phenolic OH).

DETAILED DESCRIPTION OF THE INVENTION

Technical Problem

The present application provides a novel preparation method of a low-molecular lignin derivative.

Technical Solution

According to an aspect, provided is a preparation method of a low-molecular lignin derivative, the method including
preparing lignin by hydrolyzing lignocellulosic biomass with an acid;
preparing a first mixture by mixing 100 parts by weight of the lignin and 500 parts by weight or more of a phenolic compound;
preparing a second mixture by mixing the first mixture with a solvent including a hydrophobic polar solvent; and
recovering a low-molecular lignin derivative from the second mixture.

Advantageous Effects of the Invention

It is possible to prepare a low-molecular lignin derivative with a high yield by reacting lignin, which is obtained by hydrolyzing lignocellulosic biomass with an acid, with a phenolic compound. Further, it is proposed that the less available lignin derivative can be utilized as a starting material of other chemical reactions such as preparation of commercial polymer resins.

BEST MODE

Hereinafter, a preparation method of a low-molecular lignin derivative according to an exemplary embodiment will be described in more detail.

The preparation method of a low-molecular lignin derivative according to an embodiment includes the steps of: preparing lignin obtained by hydrolyzing lignocellulosic biomass with an acid; preparing a first mixture by mixing 100 parts by weight of the lignin and 500 parts by weight or more of a phenolic compound; preparing a second mixture by mixing the first mixture with a solvent including a hydrophobic polar solvent; and recovering a low-molecular lignin derivative from the second mixture.

In the preparation method, a lignin condensation polymer obtained by hydrolyzing lignocellulosic biomass with an acid is used as a starting material to remarkably improve a yield of the low-molecular lignin derivative, compared to use of the lignocellulosic biomass as a starting material.

Since the lignin obtained by hydrolysis using the acid is a polymer lignin which is separated from cellulose due to increased insolubility by a carbon-carbon condensation reaction, it has been considered that the polymer lignin is not suitable to be used in the preparation of the low-molecular lignin derivative. In contrast, when the polymer lignin is used in the above preparation method, a yield of the low-molecular lignin derivative can be improved.

In the preparation method, the acid used in the hydrolysis of lignocellulosic biomass may be hydrochloric acid, but is not limited thereto. Any acid such as sulfuric acid or nitric acid may be used as long as it may be used in the art.

In the preparation method, the lignin is a dry lignin powder obtained by neutralizing, drying, and pulverizing a lignin separated from an acid hydrolysate of lignocellulosic biomass. For example, lignocellulosic biomass is subjected to hydrolysis by mixing it with an acid, and then neutralized by washing the lignocellulosic biomass with water until the pH reaches 5.0 or higher. Subsequently, the neutralized lignin is dried and pulverized to obtain a fine powder of lignin. The dry lignin powder may be used in the preparation method of the present application to further improve the yield of low-molecular lignin derivative.

In the preparation method, the phenolic compound may be one or more selected from the group consisting of phenol, o-cresol, m-cresol, p-cresol, catechol, resorcinol, hydroquinone, and pyrogallol, but is not limited thereto. Any compound may be used as long as it is a compound having a phenol skeleton and may be also used in the art.

In the step of preparing the first mixture, 500 parts by weight or more of the phenolic compound may be mixed, based on 100 parts by weight of lignin. Specifically, for example, 500 to 2000 parts by weight of the phenolic compound may be mixed, based on 100 parts by weight of lignin. For example, 550 to 1000 parts by weight of the phenolic compound may be mixed, based on 100 parts by weight of lignin. For example, 600 to 800 parts by weight of the phenolic compound may be mixed, based on 100 parts by weight of lignin. When 500 to 2000 parts by weight of the phenolic compound, based on 100 parts by weight of lignin is used, the low-molecular lignin derivative may be prepared with a high yield. Even when the content of the phenolic compound is 2000 parts by weight or more, based on 100 parts by weight of lignin, an increase in the yield of the low-molecular lignin derivative is insignificant, which is inefficient.

In the preparation method, mixing of the lignin with the phenolic compound may be performed at 25° C. or higher. For example, mixing of the lignin with the phenolic compound may be performed at a temperature range of 25 to 160° C. For example, mixing of the lignin with the phenolic compound may be performed at a temperature range of 70 to 160° C. For example, mixing of the lignin with the phenolic compound may be performed at a temperature range of 80 to 140° C. The low-molecular lignin derivative may be prepared in a high yield within the above temperature range. When the mixing temperature is lower than 25° C., degradation of lignin may be deteriorated. Even when the mixing temperature is higher than 160° C., degradation of lignin is not increased as high as the temperature increases, which is inefficient.

In the preparation method, mixing of the lignin with the phenolic compound may be performed for 1 hour or longer. In the preparation method, for example, mixing of the lignin with the phenolic compound may be performed for 1 hour to 100 hours. In the preparation method, while the lignin and the phenolic compound are mixed, the lignin may be reacted with the phenolic compound to prepare the low-molecular lignin derivative. When the mixing time is too short, degradation of lignin may be deteriorated. When the mixing time is too long, the entire process may be prolonged, which is inefficient.

In the preparation method, the first mixture may further include an acid. The first mixture further includes the acid to promote degradation of lignin.

The acid further added to the first mixture may be one or more selected from the group consisting of sulfuric acid, hydrochloric acid, nitric acid, phosphoric acid, and Lewis acid, but is not limited thereto. Any acid may be used as long as it may be used in the art.

In the preparation method, a concentration of the acid included in the first mixture may be 5% or higher. In the preparation method, for example, a concentration of the acid included in the first mixture may be 10% or higher. When the acid included in the first mixture has a high concentration of 5% or higher, degradation of lignin may be promoted. The acid used in the preparation of the first mixture may have a concentration of 5 to 42%. For example, the acid used in the preparation of the first mixture may have a concentration of 10 to 20%.

In the preparation method, the hydrophobic polar solvent may be one or more selected from the group consisting of alkyl ketone, alkyl amide, ether, aromatic hetero rings, and aliphatic alcohols, but is not limited thereto. Any hydrophobic polar solvent may be used as long as it is able to dissolve the low-molecular lignin derivative and may also be used in the art.

Preferably, the hydrophobic polar solvent which is able to selectively dissolve the low-molecular lignin derivative is diethyl ether.

The hydrophobic solvent used in the preparation method may have a dipole moment of 1D (debye) or higher. For example, diethyl ether has a dipole moment of 1.15 D, and acetone has a dipole moment of 2.88 D.

In the preparation method, the solvent including the hydrophobic solvent may further include a poor solvent. The poor solvent is a solvent having a low solubility for lignin. As the solvent including the hydrophobic polar solvent further includes the poor solvent for lignin, the lignin derivative having a high molecular weight may be precipitated by the poor solvent and thus separated. For example, the poor solvent may be n-hexane, but is not limited thereto. Any solvent may be used as long as it is a solvent having a relatively low solubility for lignin and also used in the art. Preferably, the predetermined solvent may be a poor solvent for a lignin derivative having a high molecular weight and may be a solvent for a lignin derivative having a low molecular weight. The solubility of the lignin derivative in a solvent may differ depending on its molecular weight, and thus a proper solvent is selected to separate a lignin derivative having a low molecular weight from a lignin derivative having a relatively high molecular weight.

For example, in the preparation method, the solvent including the hydrophobic polar solvent may be a solvent mixture of ether and n-hexane. For example, the solvent mixture may be a solvent mixture of diethyl ether and n-hexane.

In the preparation method, a precipitate included in the second mixture may be recycled and added to the first mixture. As the precipitate included in the second mixture may be recovered and added to the first mixture, a recovery rate of the low-molecular lignin derivative from lignocellulosic biomass may be improved. The precipitate may be a polymer insoluble including the lignin derivative having a high molecular weight.

In the preparation method, a content of the precipitate included in the second mixture may be 35% or less, based on the total weight of the lignin. That is, 65% or more of the total weight of lignin is the low-molecular lignin derivative, and it may be recovered in a state dissolved in the hydrophobic polar solvent. For example, the content of the precipitate included in the second mixture may be 25% or less, based on the total weight of the lignin. That is, 75% or more of the total weight of lignin is the low-molecular lignin derivative, and it may be recovered in a state dissolved in the hydrophobic polar solvent. For example, the content of the precipitate included in the second mixture may be 20% or less, based on the total weight of the lignin. That is, 80% or more of the total weight of lignin is the low-molecular lignin derivative, and it may be recovered in a state dissolved in the hydrophobic polar solvent. Further, the low-molecular lignin derivative dissolved in the hydrophobic solvent may be used as a starting material in a polymer preparation without an additional treatment process. The hydrophobic polar solvent including the low-molecular lignin derivative may be removed by distillation, etc.

In the preparation method, the step of recovering the low-molecular lignin derivative from the second mixture may include the steps of separating a hydrophobic polar solvent layer from the second mixture; preparing a third mixture by mixing the separated hydrophobic polar solvent layer with a hydrophobic non-polar solvent; and recovering the precipitated low-molecular lignin derivative from the third mixture.

The hydrophobic non-polar solvent may be one or more selected from the group consisting of aromatic hydrocarbons and aliphatic hydrocarbons, but is not limited thereto. Any hydrophobic non-polar solvent may be used as long as it may be used in the art.

Specifically, the hydrophobic non-polar solvent may be one or more selected from the group consisting of benzene, toluene, xylene, n-hexane, cyclohexane, heptane, and octane.

The hydrophobic non-polar solvent may have a dipole moment of less than 0.5 D (debye). For example, n-hexane has a dipole moment of 0.

MODE OF THE INVENTION

Hereinafter, the present application will be described in more detail with reference to Examples and Comparative Examples. However, these Examples are for illustrative purposes only, and the scope of the present application is not intended to be limited by these Examples.

(Preparation of Low-Molecular Lignin Derivative Using Strong Acid)

EXAMPLE 1

Preparation of Low-Molecular Lignin Derivative Using Fine Lignin Powder (in Examples 1~9, Dry Fine Powder of Hydrochloric Acid Lignin was Used)

(Step of Lignin Preparation)

Calliandra was used as lignocellulosic biomass. Calliandra was pulverized to have a diameter of 0 8 mm or less, and mixed with 42% hydrochloric acid at a weight ratio of 1:5 (w/v). The mixture was allowed to react at 20° C. for 5 hours, and then filtered to collect lignin. The collected lignin was washed with water several times until the pH reached 5 or higher. The neutralized lignin was dried and then pulverized to prepare a dry fine powder of lignin.

(Step of First Mixture Preparation)

The lignin was mixed with p-cresol at a weight ratio of 1:10 (w/w), and 10 ml of 20% hydrochloric acid was added thereto, and they were mixed at 80° C. for 12 hours to prepare a first mixture. For the mixing time, the lignin and p-cresol were reacted to obtain a low-molecular lignin derivative.

(Step of Second Mixture Preparation)

A solvent mixture of 50 ml of diethyl ether and 250 ml of deionized water was added to 10 ml of the first mixture, and the mixture was put and mixed in a separating funnel to separate a diethyl ether layer and an aqueous layer from the mixture and to recover a diethyl ether insoluble.

(Step of Low-Molecular Lignin Derivative Collection)

The diethyl ether layer was concentrated to 20 ml, and 400 ml of n-hexane was added dropwise to collect a low-molecular lignin derivative as a hexane insoluble, from which unreactedp-cresol was removed.

EXAMPLE 2

A low-molecular lignin derivative was prepared in the same manner as in Example 1 except that the mixing time of lignin and p-cresol was changed to 24 hours.

EXAMPLE 3

A low-molecular lignin derivative was prepared in the same manner as in Example 1 except that the mixing time of lignin and p-cresol was changed to 48 hours.

EXAMPLE 4

A low-molecular lignin derivative was prepared in the same manner as in Example 1 except that the temperature of the mixture of lignin and p-cresol was changed to 100° C.

EXAMPLE 5

A low-molecular lignin derivative was prepared in the same manner as in Example 1 except that the mixing ratio of lignin and p-cresol was changed to 1:6 (w/w), the temperature of the mixture was changed to 100° C., and the mixing time was changed to 24 hours.

EXAMPLE 6

A low-molecular lignin derivative was prepared in the same manner as in Example 1 except that the mixing ratio of lignin and p-cresol was changed to 1:7 (w/w), the temperature of the mixture was changed to 100° C., and the mixing time was changed to 24 hours.

EXAMPLE 7

A low-molecular lignin derivative was prepared in the same manner as in Example 1 except that the mixing ratio of lignin and p-cresol was changed to 1:8 (w/w), the temperature of the mixture was changed to 100° C., and the mixing time was changed to 24 hours.

EXAMPLE 8

A low-molecular lignin derivative was prepared in the same manner as in Example 1 except that the diethyl ether insoluble obtained in Example 1 was collected and dried, and then used instead of the lignin in the step of first mixture preparation, and the mixing ratio of the insoluble and p-cresol was changed to 1:8 (w/w), the temperature of the mixture was changed to 100° C., and the mixing time was changed to 24 hours.

EXAMPLE 9

(A Continuous Process of Reacting Cresol Immediately After Treatment of Lignocellulose with Strong Acid and Using No Fine Powder of Lignin)

(Step of Lignin Preparation)

Calliandra was used as lignocellulosic biomass. Calliandra was pulverized to have a diameter of 0.8 mm or less, and mixed with 42% hydrochloric acid at a weight ratio of 1:5 (w/v). The mixture was allowed to react at 20° C. for 5 hours.

(Step of First Mixture Preparation)

The reaction product was mixed with para-cresol (p-cresol) at a weight ratio of 1:10 (w/w), based on lignocellulosic biomass, at 80° C. for 48 hours to prepare a first mixture. For the mixing time, the lignin and p-cresol were reacted to obtain a low-molecular lignin derivative.

(Step of Second Mixture Preparation)

80 ml of methyl ethyl ketone was added to 10 ml of the first mixture, and they were mixed to separate a methyl ethyl ketone layer from the first mixture and to recover a methyl ethyl ketone insoluble. The separated methyl ethyl ketone layer was washed with water several times to remove the acid.

The methyl ethyl ketone layer was added dropwise to 200 ml of diethyl ether to recover a diethyl ether insoluble.

The diethyl ether insoluble was dissolved in acetone to collect an acetone insoluble.

The acetone layer was concentrated to 10 ml, and then added dropwise to 200 ml of diethyl ether to recover a diethyl ether insoluble.

(Step of Low-Molecular Lignin Derivative Collection)

The diethyl ether layer was concentrated to 20 ml, and 400 ml of n-hexane was added dropwise to collect a low-molecular lignin derivative as a hexane insoluble, from which unreacted p-cresol was removed.

COMPARATIVE EXAMPLE 1

A low-molecular lignin derivative was prepared in the same manner as in Example 1 except that the mixing ratio of lignin and p-cresol was changed to 1:1 (w/w), the temperature of the mixture was changed to 100° C., and the mixing time was changed to 24 hours.

COMPARATIVE EXAMPLE 2

A low-molecular lignin derivative was prepared in the same manner as in Example 1 except that the mixing ratio of lignin and p-cresol was changed to 1:3 (w/w), the temperature of the mixture was changed to 100° C., and the mixing time was changed to 24 hours.

COMPARATIVE EXAMPLE 3

A low-molecular lignin derivative was prepared in the same manner as in Example 1 except that the mixing ratio of lignin and p-cresol was changed to 1:5 (w/w), the temperature of the mixture was changed to 100° C., and the mixing time was changed to 24 hours.

Experimental results of the preparation methods of the low molecular lignin were summarized in the following Table 1, together with experimental conditions.

Example 8, in which the recycled lignin was used, a recovery rate of the low-molecular lignin derivative was 73% or higher.

Further, the low molecular lignin was collected in a high yield by only one purification process in Examples 1 to 8, compared to Example 9, in which a plurality of purification processes were required.

In contrast, in the preparation methods of Comparative Examples 1 to 3, in which the mixing ratio of the lignin:phenolic compound was less than 1:5.5, the content of the low-molecular lignin derivative dissolved in the organic solvent was less than 50%.

Further, the content of the lignin insoluble was remarkably reduced, compared to 104% of lignin insoluble described in paragraph [0030] of the Japanese Patent Publication No. 2011-001502.

That is, the recovery rate of the low-molecular lignin derivative was remarkably increased by using the acid-treated lignin as a starting material.

INDUSTRIAL APPLICABILITY

It is possible to prepare a low-molecular lignin derivative with a high yield by reacting lignin, which is obtained by hydrolyzing lignocellulosic biomass with an acid, with a phenolic compound. Further, it is proposed that the less available lignin derivative can be utilized as a starting material of other chemical reactions such as preparation of commercial polymer resins.

The invention claimed is:

1. A preparation method of a low-molecular lignin derivative, the method comprising:
   preparing lignin by hydrolyzing a hydrophilic carbohydrate of lignocellulosic biomass with an acid;
   preparing a first mixture by mixing 100 parts by weight of the lignin and 500 parts by weight or more of a phenolic compound, and a second acid;
   preparing a second mixture by mixing the first mixture with a solvent including a hydrophobic polar solvent; and

TABLE 1

| Component | Weight ratio of phenolic compound/ lignin | Reaction temperature [° C.] | Reaction time [hr] | Content of methyl ethyl ketone insoluble [wt % of lignin] | Content of acetone insoluble [wt % of lignin] | Content of diethyl ether insoluble [wt % of lignin] | Weight average molecular weight of low-molecular lignin derivative |
|---|---|---|---|---|---|---|---|
| Example 1 | 10 | 80 | 12 | — | — | 26.5 | 892 |
| Example 2 | 10 | 80 | 24 | — | — | 22.5 | 784 |
| Example 3 | 10 | 80 | 48 | — | — | 17.9 | — |
| Example 4 | 10 | 100 | 12 | — | — | 12.1 | — |
| Example 5 | 6 | 100 | 24 | — | — | 24.5 | — |
| Example 6 | 7 | 100 | 24 | — | — | 22.2 | — |
| Example 7 | 8 | 100 | 24 | — | — | 16 | — |
| Example 8 | 8 | 100 | 24 | — | — | 33.9 | — |
| Example 9 | 10 | 80 | 48 | 2.1 | 5.8 | 23.2 | — |
| Comparative Example 1 | 1 | 100 | 24 | — | — | undetectable | — |
| Comparative Example 2 | 3 | 100 | 24 | — | — | 141.3 | — |
| Comparative Example 3 | 5 | 100 | 24 | — | — | 51.1 | — |

As shown in Table 1, in the preparation methods of Examples 1 to 9, in which a mixing ratio of lignin:phenolic compound was 1:5.5 or higher, the content of the diethyl ether insoluble was 35% or less. Consequently, a recovery rate of the low-molecular lignin derivative dissolved in the organic solvent was 65% or higher. In particular, except recovering a low-molecular lignin derivative from the second mixture, wherein the mixing of the lignin with the phenolic compound is performed at 25° C. to 160° C. for 1 hour or longer to react the lignin and the phenolic compound.

2. The preparation method according to claim 1, wherein the acid hydrolyzing lignocellulosic biomass comprises hydrochloric acid.

3. The preparation method according to claim 1, wherein the lignin comprises a dry lignin powder obtained by neutralizing, drying, and pulverizing a lignin separated from a hydrolysate of lignocellulosic biomass.

4. The preparation method according to claim 1, wherein the phenolic compound is one or more selected from the group consisting of phenol, o-cresol, m-cresol, p-cresol, catechol, resorcinol, hydroquinone, and pyrogallol.

5. The preparation method according to claim 1, wherein 550 to 2000 parts by weight of the phenolic compound is mixed, based on 100 parts by weight of lignin.

6. The preparation method according to claim 1, wherein the mixing of the lignin with the phenolic compound is performed at 70° C. to 160° C.

7. The preparation method according to claim 1, wherein the second acid is one or more selected from the group consisting of sulfuric acid, hydrochloric acid, nitric acid, phosphoric acid, and Lewis acid.

8. The preparation method according to claim 1, wherein the hydrophobic polar solvent is one or more selected from the group consisting of alkyl ketone, alkyl amide, ether, aromatic hetero rings, and aliphatic alcohols.

9. The preparation method according to claim 8, wherein the hydrophobic polar solvent comprises diethyl ether.

10. The preparation method according to claim 1, wherein the hydrophobic polar solvent has a dipole moment of 1 debye or higher.

11. The preparation method according to claim 1, wherein the solvent including the hydrophobic polar solvent further includes a poor solvent.

12. The preparation method according to claim 1, wherein a precipitate in the second mixture is recycled and added to the first mixture.

13. The preparation method according to claim 1, wherein a content of the precipitate in the second mixture is 30% or less of the total weight of lignin.

14. A preparation method of a low-molecular lignin derivative, the method comprising:

preparing lignin by hydrolyzing lignocellulosic biomass with an acid;

preparing a first mixture by mixing 100 parts by weight of the lignin and 500 parts by weight or more of a phenolic compound;

preparing a second mixture by mixing the first mixture with a solvent including a hydrophobic polar solvent; and recovering a low-molecular lignin derivative from the second mixture, wherein the mixing of the lignin with the phenolic compound is performed at 25° C. to 160° C. to react the lignin and the phenolic compound, wherein the recovering the low-molecular lignin derivative from the second mixture comprises:

separating a hydrophobic polar solvent layer from the second mixture;

preparing a third mixture by mixing the separated hydrophobic polar solvent layer with a hydrophobic non-polar solvent; and recovering the precipitated low-molecular lignin derivative from the third mixture.

15. The preparation method according to claim 14, wherein the hydrophobic non-polar solvent is one or more selected from the group consisting of aromatic hydrocarbons and aliphatic hydrocarbons.

16. The preparation method according to claim 14, wherein the hydrophobic non-polar solvent is one or more selected from the group consisting of benzene, toluene, xylene, n-hexane, cyclohexane, heptane, and octane.

17. The preparation method according to claim 14, wherein the hydrophobic non-polar solvent has a dipole moment of less than 0.5 debye.

* * * * *